United States Patent [19]
Goldberger et al.

[11] 3,732,661
[45] May 15, 1973

[54] APPARATUS FOR MAKING A HEAT-SEALABLE BAG

[75] Inventors: Irving Goldberger, Island Park; Murray Maltz, Brooklyn, both of N.Y.

[73] Assignee: National Environmental Corp., Brooklyn, N.Y.

[22] Filed: Jan. 18, 1971

[21] Appl. No.: 107,290

[52] U.S. Cl. ..................... 53/134, 53/373, 229/54 R
[51] Int. Cl. .... B65b 61/14, B65b 51/10, B65d 33/10
[58] Field of Search .......................... 53/14, 134, 138, 53/128, 373; 93/35 H; 229/52 A, 52 B, 54, 56

[56] References Cited

UNITED STATES PATENTS

| | | | |
|---|---|---|---|
| 2,192,605 | 3/1940 | Salfisberg | 53/14 X |
| 2,259,878 | 10/1941 | Clancy | 53/134 X |
| 2,406,018 | 8/1946 | Irmscher | 93/35 H |
| 2,591,935 | 8/1952 | Heigl | 93/128 X |
| 3,128,035 | 4/1964 | Teweles | 229/68 C X |
| 3,367,085 | 2/1968 | Parsons | 53/14 |
| 3,442,437 | 5/1969 | Mann | 229/54 |

*Primary Examiner*—Granville Y. Custer, Jr.
*Assistant Examiner*—Neil Abrams
*Attorney*—Steinberg and Blake

[57] ABSTRACT

An apparatus for manufacturing a bag comprising a heat-sealable thermoplastic sheet material and having an initially open end through which material is placed in the bag. The bag has a handle and is closed by heat sealing the initially open end thereof. The handle may be applied to the bag prior to the heat sealing thereof or the handle can be formed in the bag simultaneously with the heat sealing thereof. The apparatus for sealing the bag and forming the handle therein includes a support for the initially open end of the bag and a heat-sealing wire having a handle-forming portion for forming in the bag a handle simultaneously with the sealing of the bag.

3 Claims, 16 Drawing Figures

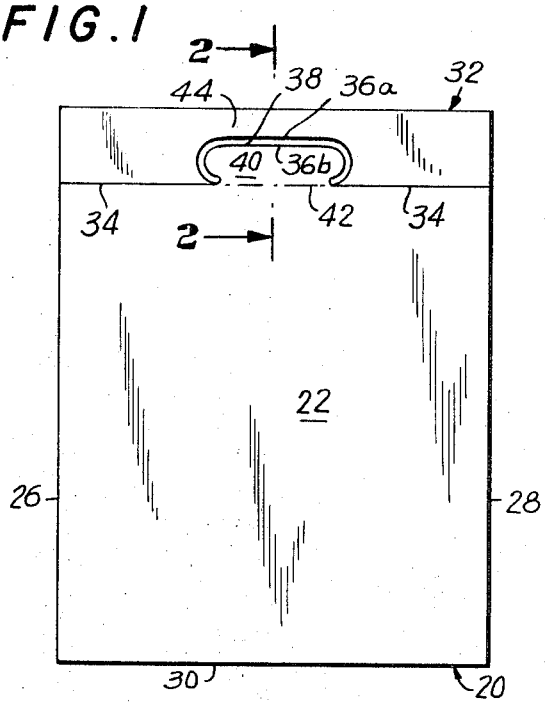
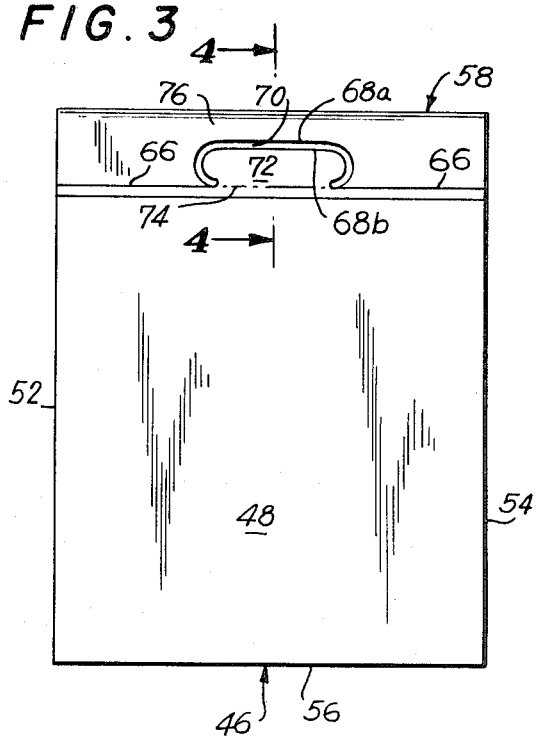
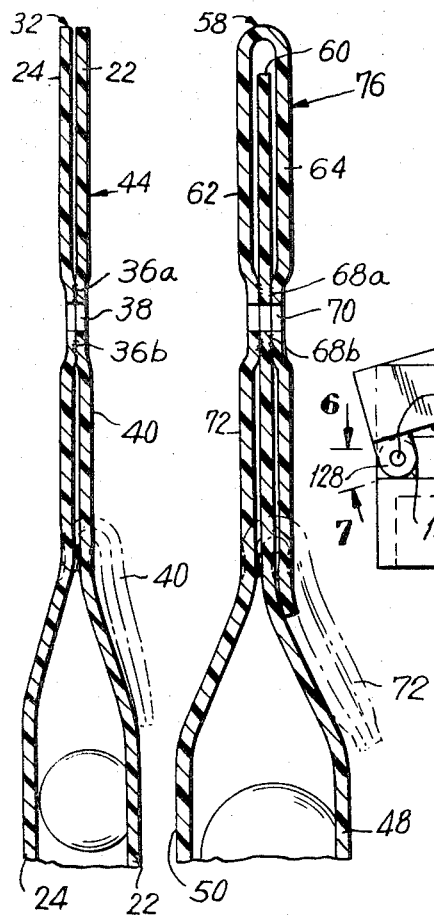
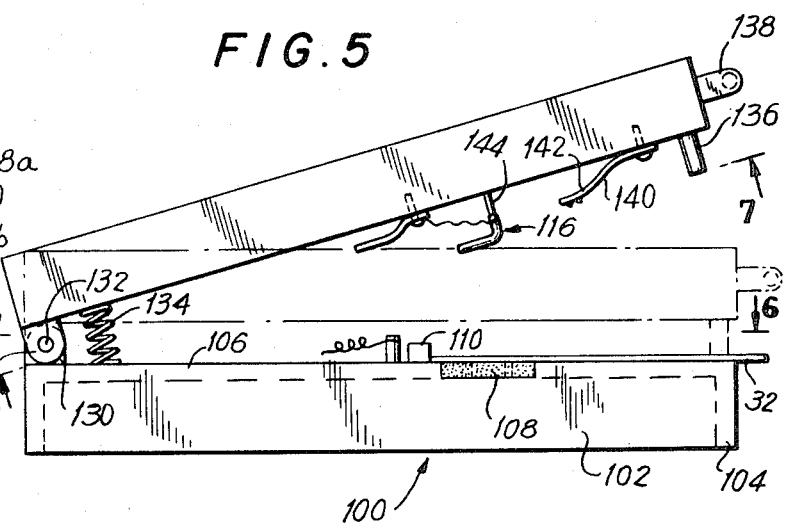

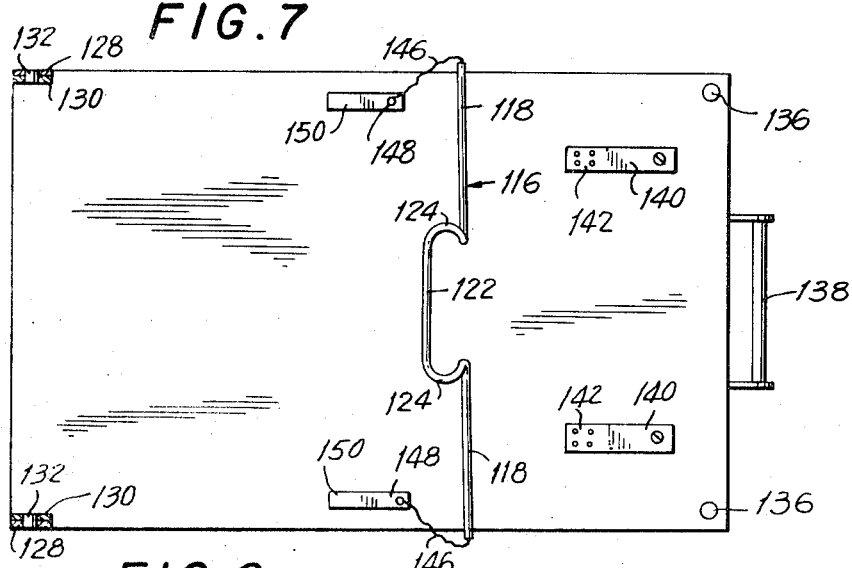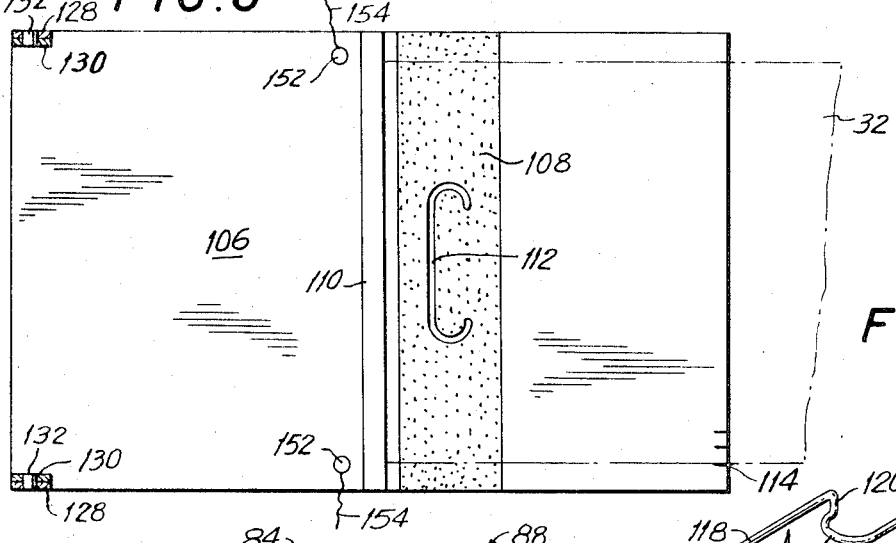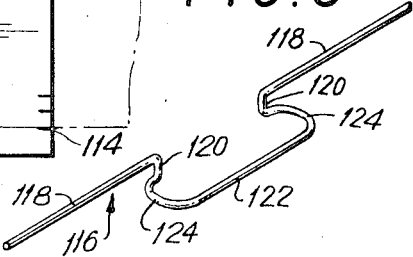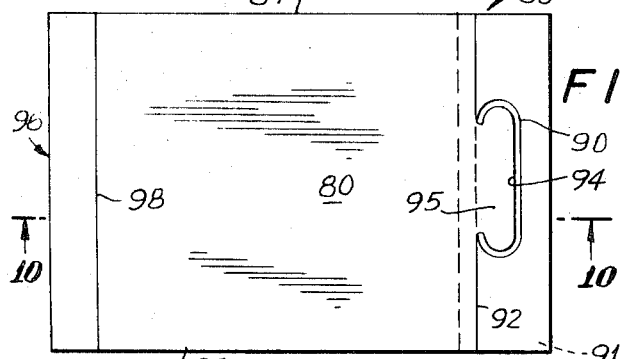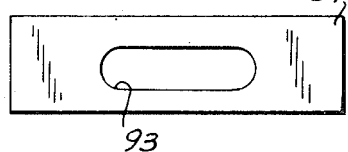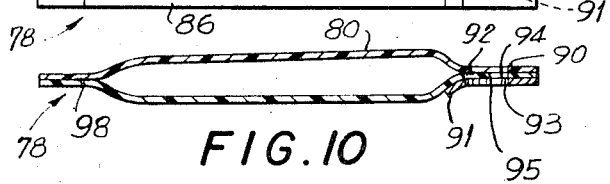

INVENTOR.
IRVING GOLDBERGER
MURRAY MALTZ
BY
*Steinberg and Blake*
ATTORNEYS

APPARATUS FOR MAKING A HEAT-SEALABLE BAG

BACKGROUND OF THE INVENTION

The present invention relates to bags in which articles or any desired material may be carried.

In particular, the present invention relates to bags of this type which consist of heat-sealable thermoplastic sheet material.

In many commercial establishments it is customary for a cashier, for example, to place purchased articles or any purchased materials in the interior of a bag when the purchaser leaves the commercial establishment with his purchases. One of the problems encountered in establishments of this type is the pilfering of articles. For example, after purchases have been made and placed in a bag, it is possible for the purchaser before leaving the establishment to place articles which have not been paid for in the bag, so that at the present time a considerable amount of losses are encountered due to thefts of this type.

Attempts have been made to avoid this problem as by stapling the initially open end of the bag, after articles have been placed therein, but such stapling serves only as an ineffective closure of the bag. It is still possible for a thief to slip articles into the bag through the end thereof which still remains open even though it is stapled. Many commercial establishments are subjected to extremely high costs involved in maintaining on hand personnel solely for the purpose of surveillance in order to attempt as much as possible to avoid thefts of this type.

SUMMARY OF THE INVENTION

It is accordingly a primary object of the present invention to provide for use in commercial establishments of this general type, or in any establishments where purchases are made and there is a possibility of thefts of the above type, an apparatus for closing the bag according to the invention in such a way that it will not be possible for a purchaser to introduce additional articles into a bag after the latter has been closed by the cashier.

A further object of the present invention is to provide in connection with a bag, an apparatus which will have a handle formed in the bag or attached thereto simultaneously with the heat sealing of the initially open end of the bag.

Also, it is an object of the invention to provide an inexpensive apparatus which can be very easily manipulated by a cashier for the purpose of closing a bag to achieve the above objects.

The objects of the present invention also include the provision of an exceedingly simple inexpensive apparatus, which will only occupy a small amount of space, in order to make it possible for a cashier to heat-seal a bag effectively after purchased articles are placed in the bag.

An additional object of the invention is to provide an apparatus according to which it becomes possible to provide the bag with a reinforcement strengthening the bag particularly at the handle region thereof.

The apparatus of the invention includes a simple support on which the initially open end of the bag is placed, with a heat-sealing means being applied to the sheet material on the support through a manually-operable means which carries the heat-sealing means. The support has an elongated opening provided with the configuration of a handle and the heat-sealing means takes the form of a wire which may be heated and which has a portion conforming to the configuration of the opening in the support to enter into this opening for cutting through the sheet material of the bag to form an opening therein while the remainder of the wire continues the heat sealing across the open end of the bag.

BRIEF DESCRIPTION OF DRAWINGS

The invention is illustrated by way of example in the accompanying drawings which form part of this application and in which:

FIG. 1 is an elevation of the one embodiment of a bag according to the invention;

FIG. 2 is a fragmentary sectional illustration of part of the bag of FIG. 1, taken along line 2—2 of FIG. 1 in the direction of the arrows and showing the bag structure at a scale which is enlarged as compared to FIG. 1;

FIG. 3 is an elevation of another embodiment of a bag according to the invention;

FIG. 4 is a fragmentary sectional elevation taken along line 4—4 of FIG. 3 in the direction of the arrows and showing the structure at the sealed, handle region of FIG. 3 at a scale which is enlarged as compared to FIG. 3;

FIG. 5 is a side elevation of an apparatus for closing a bag and simultaneously forming a handle therein;

FIG. 6 is a top plan view of the lower support of FIG. 5, taken along line 6—6 of FIG. 5 in the direction of the arrows;

FIG. 7 is a view of the swingable manually operable means of FIG. 5 as seen when looking upwardly toward the same, taken along line 7—7 of FIG. 5 in the direction of the arrows;

FIG. 8 is a perspective illustration of the heating wire which forms part of the apparatus of FIGS. 5–7;

FIG. 9 is an elevation of another embodiment of a bag according to the invention;

FIG. 10 is a longitudinal sectional elevation of the bag of FIG. 9 taken along line 10—10 of FIG. 9 in the direction of the arrows;

FIG. 11 shows part of the bag of FIGS. 9 and 10;

DESCRIPTION OF PREFERRED EMBODIMENTS

Figure 12:
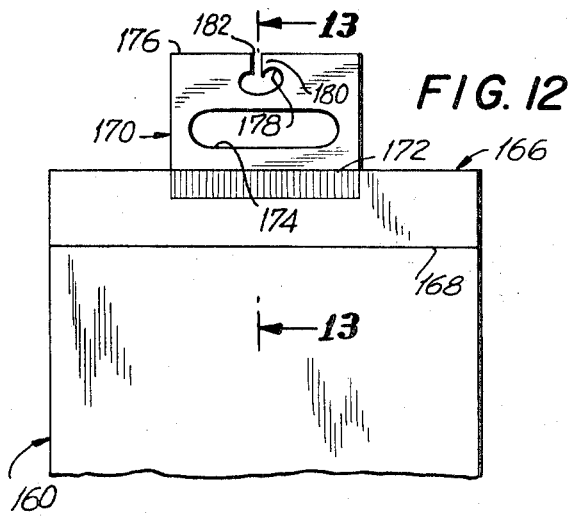
FIG. 12 illustrates a further embodiment of a bag and handle assembly according to the invention.

Referring now to the drawings and to FIGS. 1 and 2 in particular, the bag 20 of the invention which is illustrated in FIGS. 1 and 2 may consist in its entirety of a heat-sealable thermoplastic sheet material and includes a pair of walls 22 and 24 which are joined to each other along the side edges 26 and 28 and along the closed end 30 of the bag 20. For example, free edges of the walls 22 and 24 may be heat sealed to each other along the edges 26, 28, and 30.

The bag 20 will thus have initially an open end 32 through which any articles or material may be introduced into the bag. After the desired contents are placed in the bag 20, the walls 22 and 24 are heat sealed to each other at the open end 32 of the bag along the heat-sealing line 34. At its central region this heat sealing line 34 has intermediate portions 36a and 36b where the wall 22 and 24 are heat sealed to each other. These portions 36a and 36b have the configuration of a handle. They are formed by cutting through the sheet material 22 and 24 with a heat-sealing wire so as to form between the portions 36a and 36b an elongated slot 38. This slot extends through both of the sheets or walls 22 and 24, thus providing the closed bag with a flap 40 capable of being pushed by the hand of the individual carrying the bag approximately around the line 42 indicated in FIG. 1. As a result the flap 40 will become located in the dot-dash line position indicated in FIG. 2, while the fingers of the individual carrying the bag can extend around the sealed portion 36a, thus providing in this manner, simultaneously with the heat sealing of the bag a handle 44 by which the bag may conveniently be carried.

The bag 46 which is illustrated in FIGS. 3 and 4 is made up of heat-sealable walls 48 and 50 of thermoplastic sheet material also joined to each other along their side edges 52 and 54 as well as the closed end 56 of the bag to form the entire bag 46.

However, in this case the wall 50 extends at the open end 58 of the bag beyond the free edge 60 of the wall 48.

With this construction after articles or any desired material are situated in the bag, the part of the wall 50 which extends beyond the edge 60 is placed around the latter and along an outer surface of wall 48 at the open end of the bag for enclosing between layers 62 and 64 of the bag 46 a portion of the wall 48, so as to provide three layers of sheet material at the open end 58 of the bag with the embodiment of FIGS. 3 and 4.

With the sheet-material layers thus arranged as shown most clearly in FIG. 4, heat sealing is also provided in this case along the line 66 which has intermediate portions 68a and 68b where all three layers of sheet material are heat sealed to each other. These portions 68a and 68b are formed simultaneously with cutting through the sheet material by the heating wire so as to form the elongated slot 70 providing this embodiment with a flap 72 which can be pushed by the fingers of the individual carrying the bag around the line 74 into the dot-dash line position indicated in FIG. 4, so that the fingers of the individual carrying the bag can extend around the sealed portion 68a, thus forming from this bag a handle 76 simultaneously with the heat sealing of the walls of the bag to each other in order to close the bag at its initially open end. Thus, with this embodiment a stronger handle 76 is provided by the additional layer of sheet material and an even more effective closing of the bag is achieved by extending the wall 50 around the edge 60.

A third embodiment of a bag according to the invention is illustrated in FIGS. 9 and 10. This bag 78 of the invention is also made of a heat-sealable sheet material and includes a pair of walls 80 and 82. These walls are joined to each other along their side edges 84 and 86, as by being heat-sealed to each other at these edges. Both ends of the bag are initially open. At the end 88 of the bag 78 there is a handle 90 which may be identical with handle 44 and which is formed when closing end 88. This handle 90 and end 88 may be reinforced by member 91 made of heat-sealable plastic or in the form of a cardboard sheet having a heat-sealable plastic coating thereon. Member 91 is sealed to the lower member of the bag and is formed with an opening 93 through which sheet portions 95, extending along slot 94, can be turned.

After handle 90 is formed, with or without reinforcement 91, and closed at end 88 along sealing line 92, the bag 78 has an open end 96 through which articles or amy desired material are introduced into the bag. Then the bag is closed along a simple straight heat-sealing line 98 extending across the entire bag and heat-sealing the walls 80 and 82 to each other. When the filled bag 78 is carried the articles will be held therein by the sealed portion 98 of the walls of the bag, with this initially open end 96 of the bag being situated at the bottom thereof while the handle 90 is located at the top of the bag. Reinforcement 91 can be used with the bags of FIGS. 1–4 if desired.

Thus, with any of the above embodiments of the bags, there will be an effective prevention of introducing additional articles or material into the bags after they have been closed. A cashier or other individual at a commercial establishment will heat seal the bags to close the latter after the purchased articles have been placed in the bag, and thus there is no possibility of pilfering.

Thus, the bag is filled through its initially open end, and then this initially open end is closed by heat-sealing. Simultaneously with the heat-sealing of the bag to close the latter at its initially open end, a handle is formed with the embodiments of FIGS. 1–4. On the other hand, with the embodiment of FIGS. 9 and 10 the handle is provided on the bag prior to closing of the bag at its open end 96 by the heat sealing line 98.

In order to carry out the method used to make any one of the bags, an apparatus of the present invention as illustrated in FIGS. 5–8 may be provided. This apparatus 100 includes a support 102 which may rest on any suitable table such as a table or counter immediately adjacent a cash register in a commercial establishment. This support 102 has an open bottom surrounded by side walls 104 which are fixed to and extend downwardly from a top wall 106. The top wall 106 may be provided at a cut-out portion thereof with a layer 108 of a yieldable resilient material such as a suitable rubber or the like. If desired a material such as Teflon (polyfluoroethylene) may be used. The top surface of the support 102 is adapted to receive the open end of the bag after the latter is filled. Thus, the open end 32 of the bag 20 is fragmentarily illustrated in FIGS. 5 and 6.

The top surface of the support 102 is formed with a stop 110 which is fixed to and extends entirely across the top wall 106 of the support 102. The free edge of the open end of the bag is adapted to be placed against the stop 110 so as to properly situate the sheet material of the bag in the apparatus 100. Thus, the bag will extend over the portion 108 of the support 102. This portion 108 is formed with a slot 112 having the configuration most clearly shown in FIG. 6 and passing completely through the part 108 so as to communicate with the hollow interior of the support 102. At its front edge the top wall 106 of the support 102 is formed with marks 114 indicating where side edges of bags of different sizes are to be placed for locating the bags centrally between the opposed side edges of the top wall 106 of the support 102.

In order to heat-seal the walls of the bag to each other at the initially open end of the bag, a heating wire 116 having the configuration shown in FIG. 8 is used. This heating wire may be a conventional nichrome, electrically conductive wire which provides the heat required for heat sealing when a suitable current is conducted through the wire. The wire has elongated portions 118 which will form the straight outer parts of the heat-sealing line 34 of FIG. 1 or the line 66 of FIG. 3. Between these straight portions 118 the wire has downwardly extending portions 120 connected to the free ends of an elongated portion 122 having the curved end regions 124 which are of a substantially semicircular configuration. The size of this portion 122, 124, and its configuration, corresponds to the size and configuration of the slot 112, and a manually operable means is operatively connected with the heat wire 116 for displacing the latter downwardly toward the wall 106 in such a way that the portion 122, 124 of the wire pass through the slot 112 while the elongated portions 118 will engage the sheet material to heat-seal the latter. As the portion 122, 124 passes through the slot 112 the slot 38 of FIG. 1 or 70 of FIG. 3 is formed, and heat sealing of the layers of sheet material simultaneously takes place along the edges of this slot, so that in this way with a single movement of the wire 116 downwardly toward the wall 106, with part 122, 124 passing through slot 112, sealing takes place and a handle is simultaneously formed.

Of course, with the embodiment of FIGS. 9 and 10 a simple straight heating wire will be provided on a separate unit to provide sealing line 98. The unit of FIGS. 5–8 is used to form handle 90 before end 96 is closed. When reinforcement 91 is used, the operator first places the reinforcement 91 against stop 110 and then places the bag on the reinforcement. Part 122, 124 will pass through opening 93, and the reinforcement 91 is heat-sealed to the bag along line 92.

The manually-operable means which carries the heating wire 116 takes the form of a swingable cover 126 hinged to the rear end of support 102, at its wall 106, in any suitable way as by providing the hinged cover 126 with downwardly extending ears 128 overlapping upwardly directed ears 130 fixed to and extending upwardly from the wall 106, with the overlapping ears receiving suitable hinge pins or a common pivot rod 132, so that in this way the hinged cover 126 is swingably connected with the support 102 of the apparatus 100. One or more springs 134 may be compressed between components 102 and 126 in order to yieldably maintain the component 126 in the position illustrated in FIG. 5.

The cover 126 fixedly carries at its front corners a pair of spacer pins 136 which determine the space between components 102 and 126 when that latter has been turned down to the support 102. For this purpose the front end of component 126 carries a handle 138.

Adjacent its front end the component 126 carries at its underside a pair of leaf springs 140 having free springy ends 142 provided with downwardly directed roughened surfaces for engaging the upper surface of the open end of the bag which is placed on the support 102. These leaf springs 140 form a means for advancing the open end of the bag up to the stop 110. Thus, if it should happen that the cashier does not place the open end of the bag directly against the stop 110, when the cover 126 is swung downwardly, the springs 140 will engage the bag and move it all the way up to the stop 110.

The hinged cover 126, which forms the manually operable means, carries a pair of electrically non-conductive pins 144 which in turn are fixed in any suitable way to the elongated parts 118 of the wire 116 so as to support the latter beneath the hinged cover 126 in the manner indicated in FIG. 5. The pins 144 mount the wire 116 on the manually operable means 126 precisely at a location where the intermediate curved portion 122, 124 of the wire will pass into the slot 112 when the hinged cover 126 is turned down by the operator until the spacers 136 engage the top surface of wall 106. These spacers are situated far enough apart from each other to avoid engagement with a bag. When the spacers 136 engage the top surface of wall 106 of support 102, the elongated portions 188 of the heating wire 116 are pressed against the sheet material of the bag for heat sealing the walls thereof to each other at the closed end while the intermediate portion 122, 124 has passed through these walls portions into the slot 112 to form the handle with the embodiments of FIGS. 1 and 3 while simultaneously heat sealing the layers of sheet material to each other along the edges of the slot which are cut with the wire.

The ends of the wire 116 are connected with electrically conductive leads 146 which in turn are electrically connected with springy contacts 148 having free springy ends 150 which press against the top ends of stationary contact pins 152 when the bottom ends of spacers 136 engage the top surface of wall 106. These stationary contact pins 152 are connected through conductors 154 into any suitable electrical circuit which is closed when the springy contacts 150 engage the contact pins 152, so that the simple turning of the manually operable means 126 down to the position where spacers 136 engage support 102 will locate the heating wire in the electrical circuit for bringing about the desired sealing and cutting of the bag through a simple downward movement of the manually operable means 126 in opposition to the spring 134. This sealing and cutting takes place substantially instantaneously, so that immediately after the cover 126 is turned down it can be released to e returned by the spring 134 to the position illustrated in FIG. 5. Then the bag which may have its filled portion resting on the table which carries the support 102, can be removed, so that the next bag can be operated upon in the same way.

Of course, with a bag as shown in FIGS. 9 and 10, there will be no slot 112 on the second unit used to close end 96, and instead a simple straight heating wire will be provided to achieve the sealed line 98 shown in FIG. 9.

Thus, with this simple, inexpensive, compact apparatus 100, which may be very conveniently situated directly next to a cash register without occupying much space, it is possible for the cashier to seal a filled bag so that further articles or other material cannot be placed therein after the purchases have been introduced into the bag and the latter closed in the manner described above, according to the method of the invention with the apparatus of the invention.

The bags may be supplied initially in the form of a roll from which they are torn, or they may be supplied in a stack from which they are removed by the cashier. If desired the stack of initially supplied bags can be stapled together at one end and individually torn from the stack.

Figure 13:
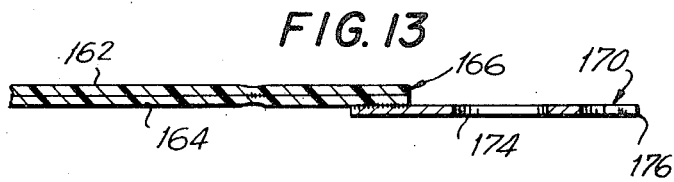
FIG. 13 is a fragmentary longitudinal sectional illustration taken along line 13—13 of FIG. 12 in the direction of the arrows.

Referring now to FIGS. 12 and 13, the bag 160 illustrated therein is also made up of a pair of walls 162 and 164 which are heat sealed to each other or otherwise joined at one end of the bag and along the side edges so as to provide the bag with an initially open end 166. The cashier or other individual who deals with the packing of the bags, such as an individual packing articles in a bag at a manufacturing plant, for example, will place the desired articles in the bag, and then the bag will be closed at its initially open end 166 with a simple straight heat-sealing line 168 which can be formed simply and quickly by a straight heat-sealing wire. This line will correspond in general to the straight heat-sealing line 98 shown in FIG. 9.

However, with the embodiment of FIGS. 12 and 13 and independent handle component 170 is provided. This individual handle is supplied to the establishment which is supplied with the bags 160. These separate handles 170 may be made of a relatively thin cardboard or other suitable sheet material coated with a heat-sealable material, so that the material for the handle 170 may be what is know as polycoated cardboard. Of course, if desired the entire sheet used for the handle 170 may be made of a heat-sealable material, thus avoiding the necessity of providing a coating on a heavy paper or cardboard or the like. In any event, the handle 170 is substantially narrower than the bag 160 and is adapted to project from the heat-sealed end 166 of the bag after the bag is closed along the simple sealing line 168. The handle 170 is placed either beneath or on top of the bag simultaneously with the heat sealing thereof along the line 168. A portion 172 of the handle 170 overlaps the bag beyond the sealing line 168 at the end region 166 of the bag, so that a considerable area of the handle 170 becomes heat sealed directly to one of the walls of the bag such as the wall 164 shown in FIG. 13. In this way an exceedingly secure connection of the handle is provided while at the same time the bag is closed along the line 168, and the handle 170 provides an exceedingly convenient means for enabling the completely closed bag to be carried about. The handles 170 can be mounted on the sealing apparatus in an exceedingly rapid and convenient manner, so that the bag of FIGS. 12 and 13 can be manufactured with an apparatus and with a method which is fully as convenient and has substantially all of the advantages of the other methods and apparatus referred to above.

For convenience of carrying, the handle component 170 is formed with an elongated slot 174 through which the individual carrying the bag can place the fingers of one hand. In addition, at its end region 176 which is distant from the bag the handle 170 is formed with a notch 178 having a configuration providing the handle component 170 with a hook 180 which facilitates placing a series of these handles on a suitable supporting rod so that the handles can be quickly removed from such a rod with the rod passing through the slot 182, for example.

Thus, with this embodiment of FIGS. 12 and 13 it is easily possible for a cashier at a commercial establishment not only to fully close the bag along the line 168 but also to attach to the bag simultaneously with the closing thereof the separate handle component 170. Furthermore, if desired, at a plant where articles are manufactured, these articles may be enclosed within the bags 160 to which handles 170 are applied at the manufacturing establishment, so that the entire fully closed article as shown in FIGS. 12 and 13 may be transmitted from a manufacturing plant to retailers enabling suitable articles to be packaged in this way with the bags having the handles 170 attached thereto.

Figure 14:
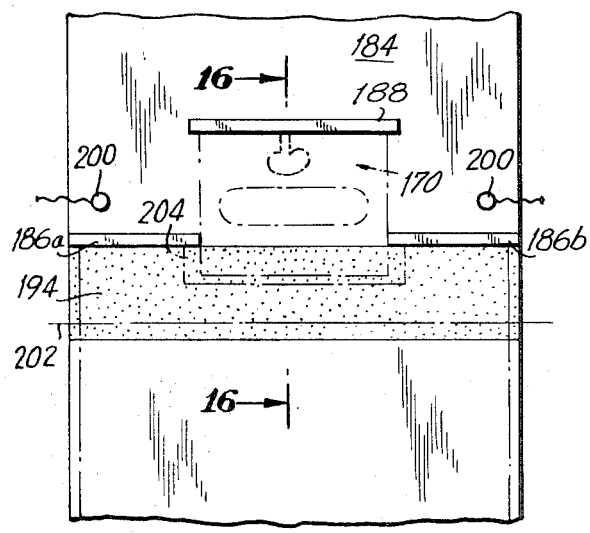
FIG. 14 is a fragmentary schematic top plan view of the base of an apparatus used to form the bags of FIG. 12 and 13.
Figure 15:
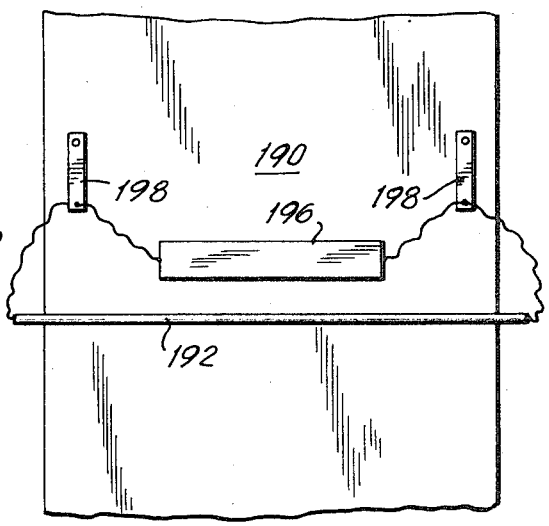
FIG. 15 is a plan view looking upwardly at the downwardly directed part of the swingable member of the apparatus which coacts with that shown in FIG. 14 to bring about the sealing of the components shown in FIGS. 12 and 13.
Figure 16:
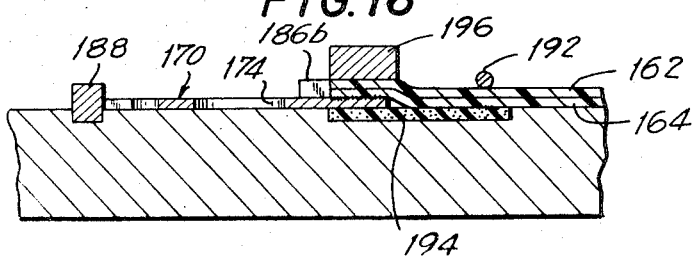
FIG. 16 is a fragmentary schematic longitudinal sectional elevation taken along line 16-16 of FIG. 14 in the direction of the arrows and schematically representing the manner in which the components of the bag of FIGS. 12 and 13 are arranged on the apparatus of FIGS. 14 and 15 during the heat-sealing of the components to each other.

FIGS. 14–16 illustrate an example of an apparatus and method for forming the bags of FIG. 12 and 13. FIG. 14 shows a base 184 of an apparatus corresponding to the apparatus 100 shown in FIG. 5 with this base 184 corresponding to the lower component 102 of FIGS. 5–7. This base 184 carries a transverse stop made up of components 186a and 186b, corresponding to the stop component 110. However, these components 186a and 186b are spaced at the central region of the base to provide between themselves a gap for receiving a handle component 170 as indicated schematically in FIG. 14. To the rear of the stop components 186a and 186b the base 184 carries a third stop component 188 against which the slotted end of the handle component 170 is placed. Thus, only the region of the handle component 170 which is to be sealed to the bag projects forwardly beyond the stop members 186a and 186b. The operator can very simply place the component 170 on the base 184 in the position indicated within FIG. 14.

Hinged to the base 184 is an upper member 190 corresponding to the upper hinged component of the apparatus of FIG. 5 and mounted and manipulated in precisely the same way as this upper hinged component of FIG. 5. However, it will be noted that in FIG. 15 the component 190 is provided with a straight transverse heat-sealing wire 192 corresponding to the heat-sealing wire 116. The base 184 is provided with a suitable layer 194 of a material such as teflon or the like for supporting the bag and handle at the portions thereof which are heat sealed. This wire 192 is supported on the hinged upper component 190 in any suitable way such as through insulating pins similar to the pins 144 shown in FIG. 5.

In addition, the upper component 190 carries a heat-sealing block or cheek 196, also through suitable insulated support pins or the like, these components 192 and 196 are electrically connected through suitable conductors with the pair of springy conductors 198 adapted to engage the stationary contacts 200 connected through suitable conductors into a suitable circuit which becomes closed when the upper hinged element is depressed precisely in the manner described above in connection with FIGS. 5–7. Thus, with this embodiment the heat-sealing wire 192 and the block 196 will have heat applied thereto when the upper hinged member 190 is turned down toward the base 184.

When these operations are carried out the heat-sealing wire 192 will extend along the line 202 indicated in FIG. 14 to provide the heat-sealing line 168 shown in FIG. 12. At the same time the block 196 will occupy the area 204 schematically represented in FIG. 14 so as to heat seal the handle 190 to the wall 164 of the bag, the heat being readily transmitted through the sheets 162 and 164 which are of a relatively thin sheet material providing substantially no resistance to travel of heat. If desired, as pointed out above, the component 170 can be placed on top of the bag so that the block 196 will directly engage the component 170 and heat seal the latter to the adjoining bag wall along the area 172 indicated in FIG. 12.

Referring to FIG. 16, there is illustrated therein the manner in which the component 170 engages the stop 188 while the overlying bag walls of the bag 160 engage the pair of stop components 186a and 186b, the component 186b being shown in FIG. 16. FIG. 16 also shows the position of the heat-sealing wire 192 and block 196 during the heat sealing operations.

What is claimed is:

1. Apparatus for closing a bag comprising a heat-sealable thermoplastic sheet material having an initially open end through which articles are placed in the bag, comprising a support on which the open end of the bag is placed after material is placed in the bag, heat sealing means for sealing walls of the bag to each other at said open end thereof while said open end is on said support, and manually-operable means carrying said sealing means for applying the latter to the open end of a bag on the support for closing the bag at said open end thereof, said support being formed with an elongated opening having the configuration of a handle, and said heat-sealing means entering into said opening while heat-sealing said open end of said bag for forming a handle therein simultaneously with the heat sealing of the bag at said open end thereof, said heat-sealing means including an elongated heating wire having a curved portion conforming to the configuration of said opening for entering into the latter and situated closer to the support than the remainder of said wire so that said curved portion will pass through sheet material of the bag to form the handle therein while simultaneously sealing the bag along the thus-formed handle, while the remainder of the wire will heat seal the remainder of the bag at the open end thereof.

2. Apparatus for closing a bag comprising a heat-sealable thermoplastic sheet material having an initially open end through which articles are placed in the bag, comprising a support on which the open end of the bag is placed after material is placed in the bag, heat-sealing means for sealing walls of the bag to each other at said open end thereof while said open end is on said support, and manually-operable means carrying said sealing means for applying the latter to the open end of a bag on the support for closing the bag at said open end thereof, a stop carried by said support for determining the location of said open end of said bag with respect to said heat-sealing means, said manually operable means carrying a means for moving the open end of the bag up to said stop.

3. Apparatus for closing a bag comprising a heat-sealable thermoplastic sheet material having an initially open end through which articles are placed in the bag, comprising a support on which the open end of the bag is placed after material is placed in the bag, heat-sealing means for sealing walls of the bag to each other at said open end thereof while said open end is on said support, and manually-operable means carrying said sealing means for applying the latter to the open end of a bag on the support for closing the bag at said open end thereof, a stop carried by said support for determining the location of the bag with respect to said heat-sealing means and said support also carrying a stop for determining the position of a handle component separate from the remainder of the bag, said heat-sealing means including a heat-sealing element for closing the bag and an additional element for heat-sealing a separate handle component to an exterior surface of the bag.

* * * * *